United States Patent [19]

Kemp et al.

[11] 4,364,450
[45] Dec. 21, 1982

[54] APPARATUS FOR MOUNTING A TRANSMISSION SELECTOR

[75] Inventors: James M. Kemp, Beloit, Wis.; Robert N. Phillips, Rockford, Ill.

[73] Assignee: Atwood Vacuum Machine Company, Rockford, Ill.

[21] Appl. No.: 222,898

[22] Filed: Jan. 6, 1981

[51] Int. Cl.³ .................. B60K 20/04; F16F 1/36; F16M 13/00; G05G 7/16
[52] U.S. Cl. .................. 180/336; 74/473 R; 248/628; 248/632; 403/291
[58] Field of Search .............. 180/336, 315, 300, 312; 74/473 R; 248/628, 632, 648; 167/160, 164, 165; 403/291

[56] References Cited

U.S. PATENT DOCUMENTS

| 1,699,332 | 1/1929 | Link ..................................... 180/300 |
| 2,063,216 | 12/1936 | Zaparka .............................. 267/165 |
| 2,171,948 | 9/1939 | Patton ................................. 403/291 |
| 3,323,609 | 6/1967 | Rosenberger et al. ............. 180/336 |
| 3,757,884 | 9/1973 | Tomita et al. ...................... 180/336 |
| 3,759,341 | 9/1973 | Takeda ................................ 180/336 |
| 4,296,907 | 10/1981 | Ishida et al. ........................ 248/634 |

Primary Examiner—Joseph F. Peters, Jr.
Assistant Examiner—Donn McGiehan
Attorney, Agent, or Firm—Leydig, Voit, Osann, Mayer & Holt, Ltd.

[57] ABSTRACT

A transmission selector is mounted on the floor of an automobile by elastomeric S-shaped straps which permit the selector to move back and forth in a longitudinal direction while holding the selector substantially rigid in vertical and transverse directions.

10 Claims, 6 Drawing Figures

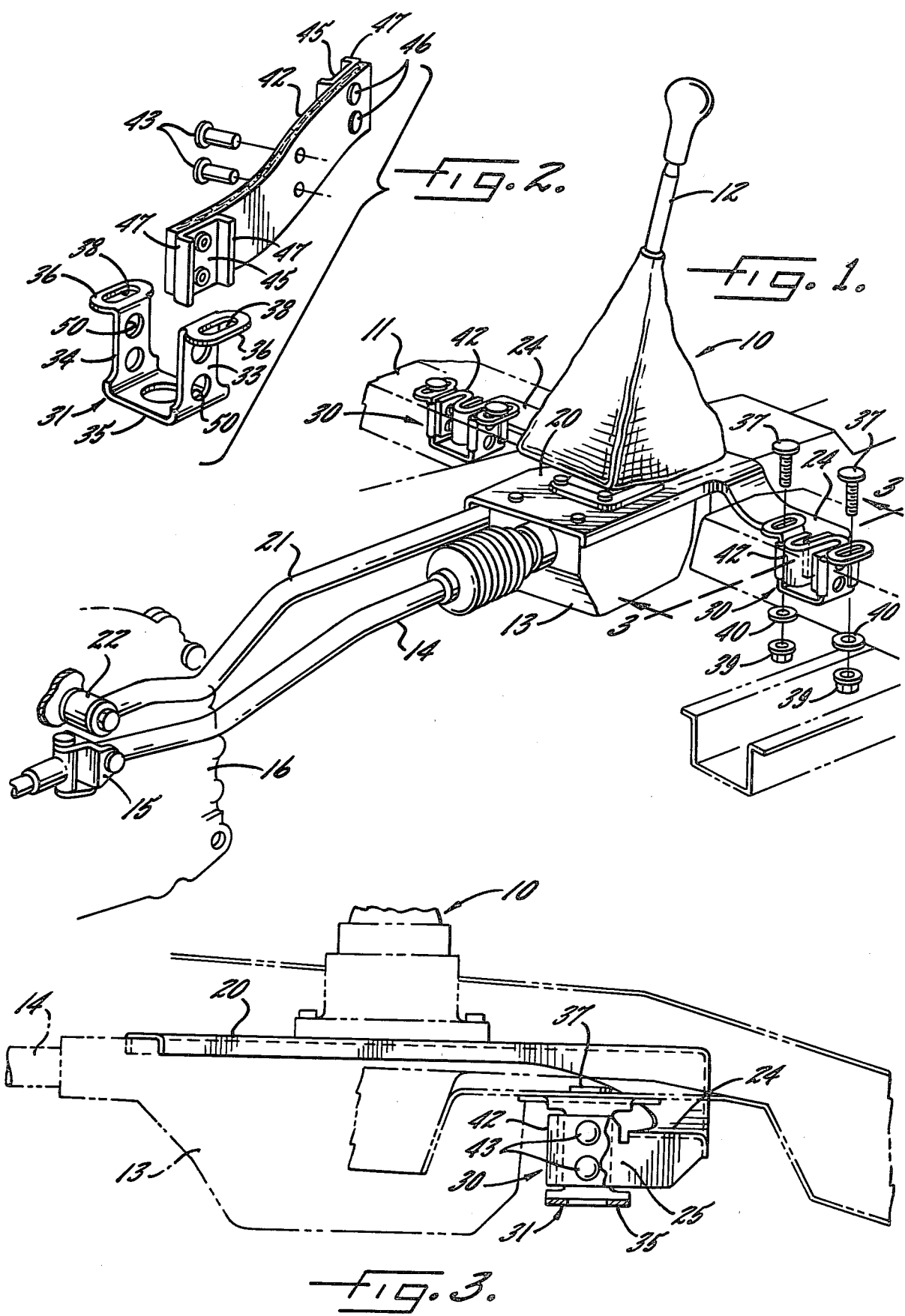

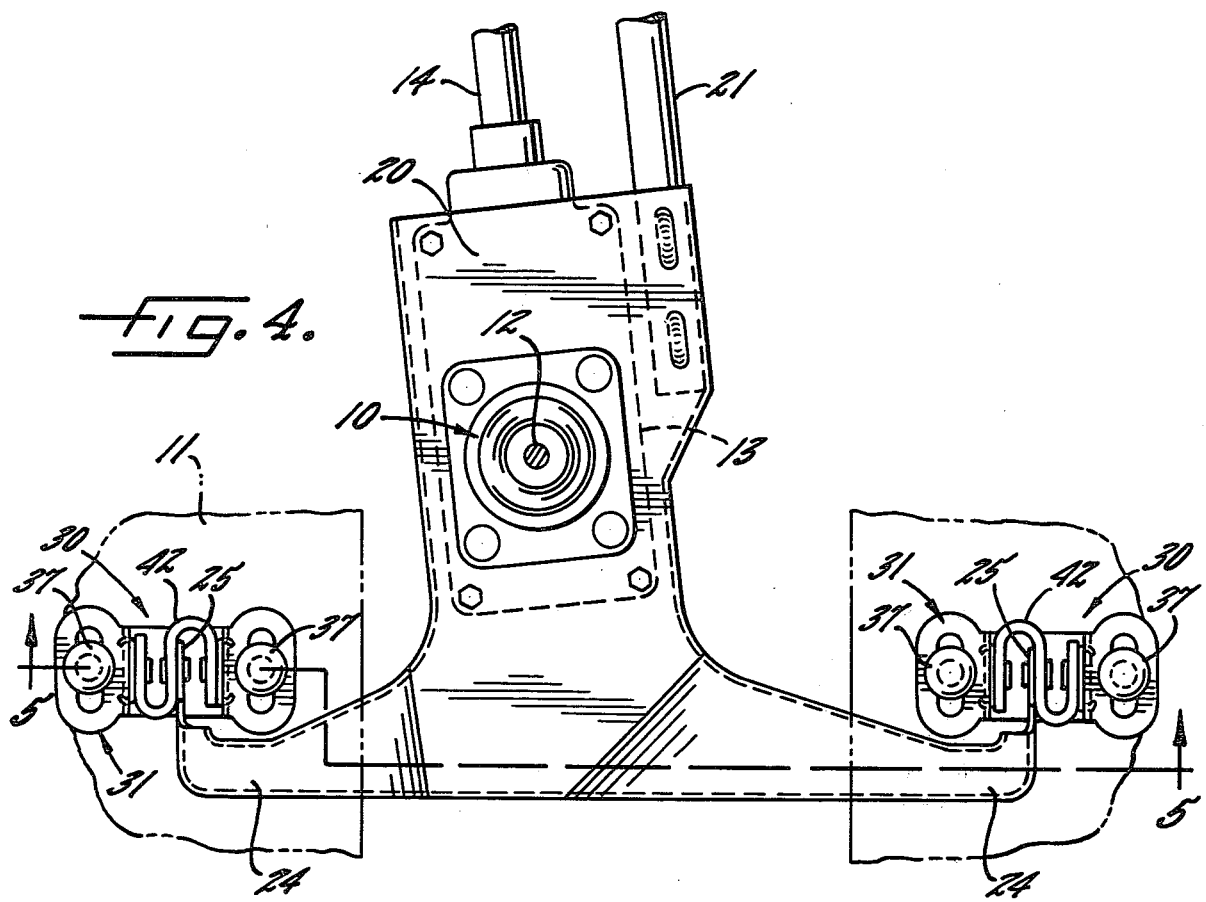
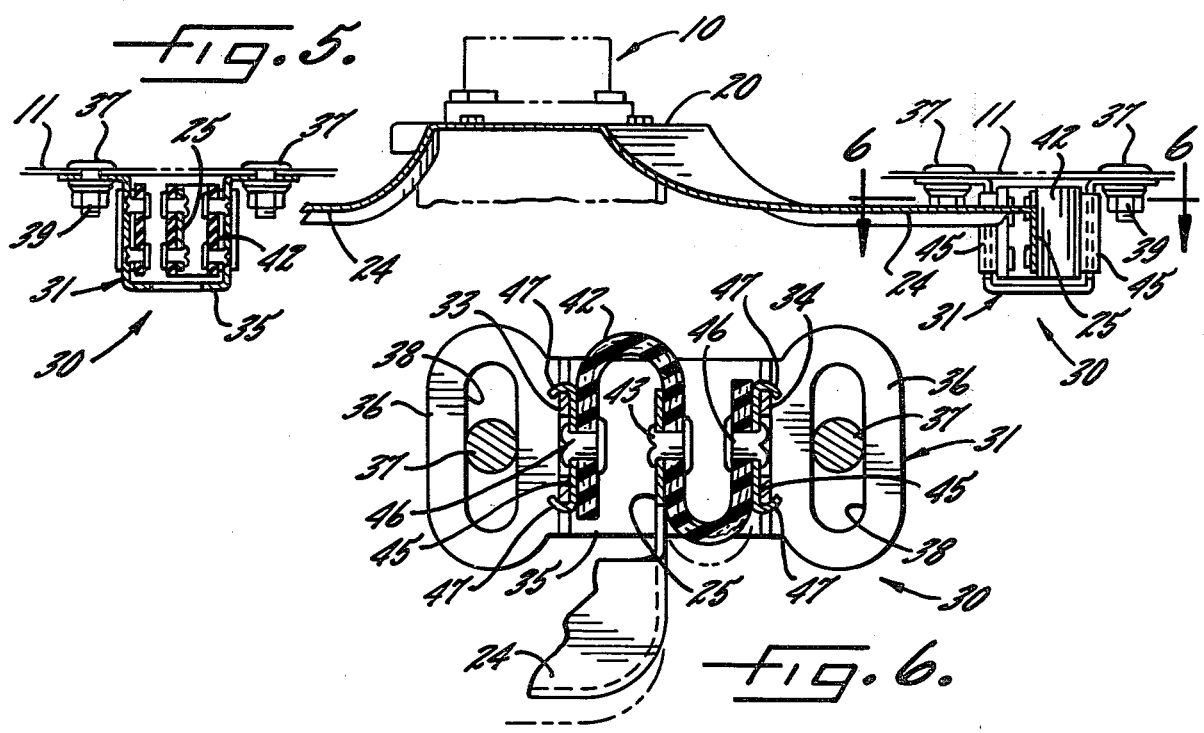

APPARATUS FOR MOUNTING A TRANSMISSION SELECTOR

BACKGROUND OF THE INVENTION

This invention relates generally to mounting apparatus and more specifically to apparatus for mounting a transmission selector on the floor of a vehicle.

In certain front wheel drive vehicles, the transmission selector includes a pair of tranversely extending mounting arms which underlie the vehicle floor and which are suspended from the floor by mounting brackets. The selector is connected by a shift linkage and a stabilizer bar to the transmission of an engine having a transversely extending crankshaft and, when the engine is running, it tends to rock back and forth in a longitudinal direction. The longitudinal rocking motion of the engine is transmitted through the stabilizer bar to the transmission selector.

SUMMARY OF THE INVENTION

The general aim of the present invention is to mount the transmission selector on the vehicle floor with new and improved apparatus which flexes to accommodate the longitudinal rocking motion of the engine while dampening vibration in the selector and which, at the same time, is relatively stiff in the transverse and vertical directions so as to mount the selector in a comparatively rigid manner in those directions.

A more detailed object is to achieve the foregoing by providing mounting apparatus in which brackets are secured to the vehicle floor and are uniquely attached to the transmission selector by generally S-shaped straps made of resiliently yieldable material. By virtue of their shape and resiliency, the straps may flex to enable longitudinal movement of the selector and yet hold the selector against any substantial transverse and vertical movement.

A further object of the invention is to provide unique brackets and straps which can be attached quickly and universally to either the right or left mounting arm of the selector.

The invention also resides in the comparatively economical, durable and trouble-free construction of the mounting apparatus.

These and other objects and advantages of the invention will become more apparent from the following detailed description when taken in conjunction with the accompanying drawings.

BRIEF DESCRIPTION OF THE DRAWINGS

FIG. 1 is a perspective view of a typical transmission selector equipped with new and improved mounting apparatus incorporating the unique features of the present invention.

FIG. 2 is an exploded perspective view of one of the mounting brackets and straps.

FIG. 3 is an enlarged fragmentary cross-section taken substantially along the line 3—3 of FIG. 1.

FIG. 4 is a fragmentary top plan view as taken along the line 4—4 of FIG. 3.

FIG. 5 is a fragmentary cross-section taken substantially along the line 5—5 of FIG. 4.

FIG. 6 is an enlarged fragmentary cross-section taken substantially along the line 6—6 of FIG. 5.

DETAILED DESCRIPTION OF THE PREFERRED EMBODIMENT

For purposes of illustration, the mounting apparatus of the present invention is shown in the drawings as being used to mount a transmission selector 10 on the floor plate 11 of an automobile or other vehicle. The selector includes a shift lever 12 which acts through mechanism (not visible) in a selector box 13 to push, pull and turn a forwardly extending shift linkage 14. The latter is connected at 15 to a front wheel drive transmission 16 which, in turn, is connected to an engine whose crankshaft in this instance extends transversely. When the lever 12 is shifted, the linkage 14 shifts the transmission 16.

The lever 12 and the box 13 are supported on the upper and lower sides, respectively, of a substantially horizontal plate 20. A stabilizer bar 21 is connected rigidly to the underside of the plate and is connected pivotally to the transmission 16 at 22.

Formed integrally with and projecting transversely in opposite directions from the plate 20 are two mounting arms 24 (FIG. 4) whose outer end portions underlie the vehicle floor 11. A tongue-like member 25 (FIGS. 4 and 6) is formed integrally with and projects forwardly from the outer end of each arm and is disposed in a generally vertical plane.

Because the crankshaft of the engine extends transversely, the engine tends to rock back and forth in the longitudinal direction and particularly when the vehicle is accelerating or decelerating. Such rocking motion is transmitted rearwardly to the transmission selector 10 through the stabilizer bar 21.

In accordance with the present invention, the transmission selector 10 is attached to the vehicle floor 11 by unique mounting assemblies 30 which flex to accommodate the longitudinal rocking motion of the engine and also dampen the vibration thereof. Each mounting assembly is, however, comparatively stiff in both a vertical direction and in a transverse direction and serves to hold the selector substantially rigid in those directions.

More specifically, one mounting assembly 30 is associated with each mounting arm 24 and each comprises a substantially U-shaped bracket 31 (FIG. 2). Each bracket is stamped from sheet metal and includes transversely spaced inner and outer upright legs 33 and 34. The legs extend parallel to and are disposed in straddling relation with the tongue 25 and are spaced transversely therefrom. A cross-piece 35 is formed integrally with and extends between the lower end portions of the two legs and is spaced below the tonque 25.

Flanges 36 are formed integrally with and extend transversely in opposite directions from the legs 33 and 34 of each bracket 31. The flanges are located slightly above the arms 24 and are disposed in face-to-face relation with the underside of the vehicle floor 11. Screws 37 (FIG. 1) extend downwardly through holes in the floor and through elongated slots 38 in the flanges 36. The flanges are clamped tightly to the floor 11 by nuts 39 which are threaded onto the screws, there being washers 40 located between the nuts and the lower sides of the flanges.

In carrying out the invention, each bracket 31 is attached to its associated tongue 25 by a generally S-shaped strap 42 which is made of resiliently yieldable material. While the strap could be made of spring steel or the like, it preferably is made from an elastomeric material. One specific material which is especially wellsuited is a two-ply, scoff cover conveyor belting material sold by The B. F. Goodrich Co. under Product No. 56-03-1062-36 and identified by the trademark FLEX-SEAL-H. The strap is rectangular in cross-section and is of elongated rectangular shape prior to being installed on the bracket 31 (see FIG. 2).

When installed, each strap 42 is flexed lengthwise into an S-shape (see FIG. 6) and is located with its long edges facing upwardly and downwardly. One end portion of the strap is fastened to the outer side of the inner leg 33, the midportion of the strap is fastened to the outer side of the tongue 25, and the opposite end portion of the strap is fastened to the inner side of the outer leg 34. The midportion of the strap 42 lies face-to-face against the outer side of the tongue 25 and is secured thereto by a pair of vertically spaced rivets 43 (FIGS. 2 and 6) which project through holes in the strap and the tongue. The heads of the rivets abut the strap.

To fasten the end portions of the strap 42, substantially U-shaped clips 45 (FIGS. 2 and 6) are attached by rivets 46 to opposite sides of the strap adjacent the ends thereof. After the midportion of the strap has been riveted to the tongue 25, the clips may be slipped over the legs 33 and 34 and then the flanges 47 of the clips may be crimped and clenched tightly around the side margins of the legs as shown in FIG. 6. The heads of the rivets 46 abut the strap while the clenched ends of the rivets abut the clips. Vertically spaced holes 50 (FIG. 2) are formed in the legs and receive the clenched ends of the rivets 46 to enable the clips to lie in flat face-to-face relationship with the legs.

When viewed from above as in FIG. 4, the strap 42 of the left mounting assembly 30 difines a true S while the strap of the right assembly defines a reverse S. The strap of the left assembly may be used on the right assembly, or vice versa, simply by turning the strap 180 degrees about its longitudinal axis prior to riveting the strap to the tongue 25 and then by flexing the strap in the proper direction.

By virtue of their S-shape, the straps 42 are capable of flexing back and forth in direction longitudinally of the vehicle and thus the straps allow the transmission selector 10 to move longitudinally back and forth when the engine rocks. Accordingly, the straps accommodate the rocking motion of the engine without any substantial restriction and prevent the shift linkage 14 from jerking the lever 12 out of its selected position as the linkage moves back and forth. Being elastomeric, the straps dampen the vibration of the engine and tends to isolate the transmission selector from such vibration.

While the straps 42 are capable of flexing in a longitudinal direction, they are relatively stiff in an edgewise or vertical direction. Each mounting assembly 30 also is comparatively stiff in the transverse direction. Thus, the selector 10 is solidly mounted in spite of its ability to move longitudinally. The straps are relatively inexpensive, are non-corrosive and are capable of withstanding exhaust pipe temperatures in the neighborhood of 200 degrees F. as well as extremely cold temperatures in the neighborhood of minus 40 degrees F. Thus, the straps are economical, durable and relatively trouble-free.

we claim:

1. Apparatus for mounting a transmission selector on the floor of a vehicle, said selector having first and second mounting arms extending transversely in opposite directions and adapted to underlie the floor, and first and second upright tongues projecting lingitudinally from said first and second arms, respectively, said apparatus comprising first and second brackets associated with said first and second tongues, respectively, and each having transversely spaced inner and outer upright legs disposed in straddling ralation with the respective tongue, means for attaching each bracket to the underside of the floor, and a generally S-shaped strap for securing each tongue to its respective bracket, said strap being made of elastomeric material and having one end portion lying alongside and secured to said inner leg, having an intermediate portion lying alongside and secured to said tongue and having an opposite end portion lying alongside and secured to said outer leg.

2. Apparatus as defined in claim 1 in which said one end portion of each strap lies along the outer side of said inner leg, in which said intermediate portion lies along the outer side of said tongue and in which said opposite end portion lies along the inner side of said outer leg.

3. Apparatus as defined in claim 1 in which both of said tongues project forwardly from said arms, one of said straps being turned angularly 180 degrees about its longitudinal axis with respect to the other strap.

4. Apparatus as defined in claim 1 including substantially U-shaped clips attached to the end portions of said strap, said clips being disposed in straddling relation with said legs and being clenched around said legs.

5. Apparatus as defined in claim 4 in which said clips are attached to opposite sides of said strap.

6. Apparatus for attaching a tongue-like member to a plate-like member, said apparatus comprising a pair of legs adapted to straddle and extend substantially parallel to said tongue-like member, means for securing said legs to said plate-like member, and a generally S-shaped strap made of resiliently yieldable material, first means for securing one end portion of said strap to one side of one of said legs, second means for securing an intermediate portion of said strap to one side of said tongue-like member, and third means for securing the opposite end portion of said strap to one side of the other of said legs.

7. Apparatus as defined in claim 6 in which said strap is made of elastomeric material.

8. Apparatus as defined in claim 6 in which said first means and said third means each comprises a substantially U-shaped clip attached to the end portion of the strap, each clip being disposed in straddling relation with its associated leg and being clenched around such leg.

9. Apparatus as defined in claim 8 further including a rivet for attaching each clip to the associated end portion of said strap, and a recess in each leg and receiving one end portion of said rivet to enable said clip to be disposed in face-to-face contact with said leg.

10. Apparatus as defined in claim 8 in which said clips are attached to opposite sides of said strap.

* * * * *